(12) United States Patent
Robison (10) Patent No.: US 7,257,808 B2
(45) Date of Patent: Aug. 14, 2007

(54) SYSTEM AND METHOD TO REDUCE THE SIZE OF SOURCE CODE IN A PROCESSING SYSTEM

(75) Inventor: Arch D. Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 670 days.

(21) Appl. No.: 10/037,774

(22) Filed: Jan. 3, 2002

(65) Prior Publication Data

US 2003/0131344 A1    Jul. 10, 2003

(51) Int. Cl.
G06F 9/45    (2006.01)
(52) U.S. Cl. ................. 717/156; 717/144; 717/159
(58) Field of Classification Search ......... 717/136–161
See application file for complete search history.

(56) References Cited

U.S. PATENT DOCUMENTS

| 4,833,606 | A | * | 5/1989 | Iwasawa et al. | 717/160 |
|---|---|---|---|---|---|
| 5,822,593 | A | * | 10/1998 | Lamping et al. | 717/161 |
| 5,835,776 | A | * | 11/1998 | Tirumalai et al. | 717/161 |
| 5,854,934 | A | * | 12/1998 | Hsu et al. | 717/161 |
| 5,867,711 | A | * | 2/1999 | Subramanian et al. | 717/161 |
| 5,930,510 | A | * | 7/1999 | Beylin et al. | 717/161 |
| 6,173,444 | B1 | * | 1/2001 | Archambault | 717/159 |
| 6,438,747 | B1 | * | 8/2002 | Schreiber et al. | 717/160 |
| 6,516,305 | B1 | * | 2/2003 | Fraser | 706/8 |
| 6,594,824 | B1 | * | 7/2003 | Volkonsky et al. | 717/159 |
| 6,651,246 | B1 | * | 11/2003 | Archambault et al. | 717/160 |
| 6,665,865 | B1 | * | 12/2003 | Ruf | 717/157 |
| 6,823,514 | B1 | * | 11/2004 | Degenaro et al. | 718/104 |
| 6,918,111 | B1 | * | 7/2005 | Damron et al. | 717/161 |

OTHER PUBLICATIONS

Wulf, et al, The Design of an Optimizing Compiler, American Elsevier Publishing Co., Inc. 1975, ISBN: 0-444-00158-1, pp. 1-43.*
William Wulf et al., The First Subphase, The Design of an Optimizing Complier, Book, 1975, pp. 110-114, American Elsevier Publishing Company, Inc.
William Wulf et al., Flo, The Design of an Optimizing Complier, Book, 1975, pp. 22-43, American Elsevier Publishing Company, Inc.
Henri E. Bal et al., Language-and Machine-Independent Global Optimization on the Intermediate Code, Computer Language vol. 11 No. 2, 1986, pp. 105-121, Pergamon Journals Ltd.

(Continued)

Primary Examiner—Tuan Dam
Assistant Examiner—Andre R Fowlkes
(74) Attorney, Agent, or Firm—Blakely, Sokoloff, Taylor & Zafman LLP (57) ABSTRACT

A system and method to reduce the size of source code in a processing system are described. Multiple subgraph structures are identified within a graph structure constructed for multiple source code instructions in a program. Unifiable variables that are not simultaneously used in the source code instructions are identified within each subgraph structure. Finally, one or more unifiable instructions from a tine of a corresponding subgraph structure are transferred to a handle of the corresponding subgraph structure, each unifiable instruction containing one or more unifiable variables.

28 Claims, 6 Drawing Sheets

OTHER PUBLICATIONS

Christopher W. Fraser, Analyzing and Compressing Assembly Code, Proceedings of the ACM SIGPLAN '84 Symposium on Complier Construction, SIGPLAN Notices vol. 19, No. 6, Jun. 1984, pp. 117-121.

Keith D. Cooper et al., Enhanced Code Compression for Embedded RISC Processors, SIGPLAN '99 (PLDI) May 1999, pp. 139-149, USA.

* cited by examiner

```
int w;

void bar( int p ) {
    int y, z, a;
    if( p ) {
        int x;
        foo(&x);
        y = 3;
        z = x*y;
        ++w;
    }
    else {
        int b;
        a = 3
        foo(&b);
        --w;
        z = a*b;
    }
    return z;
```

| | a | b | x | y | z |
|---|---|---|---|---|---|
| a | 1 | 1 | | | |
| b | 1 | 1 | | | |
| x | | | 1 | 1 | |
| y | | | 1 | 1 | |
| z | | | | | 1 |

SYSTEM AND METHOD TO REDUCE THE SIZE OF SOURCE CODE IN A PROCESSING SYSTEM

FIELD OF THE INVENTION

The present invention relates generally to compiler systems and, more particularly, to a system and method to reduce the size of source code in a processing system.

BACKGROUND OF THE INVENTION

Increasingly, the size of compiled code has an impact on the performance and economics of computer systems. From embedded systems, such as cellular phones, to applets shipped over the World Wide Web, the impact of compile-time decisions that expand the size of the source code has a direct effect on cost and power consumption, as well as on the transmission and execution time of the code.

Several techniques have been proposed to reduce the size of the source code. One known technique turns repeated code fragments into procedures and is usually applied to intermediary code or even source code. However, this technique appears to miss repeated code fragments introduced during code generation. Another known technique reuses the common tail of two merging code sequences and is usually performed after code generation. However, syntactic mismatches seem to affect the efficiency of this technique.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following descriptions for the purposes of explanation, numerous details are set forth in order to provide a thorough understanding of the present invention. However, it will be apparent to one skilled in the art that these specific details are not required in order to practice the present invention. In other instances, well-known electrical structures or circuits are shown in block diagram form in order not to obscure the present invention unnecessarily.

A system and method to reduce the size of source code in a processing system are described. Multiple subgraph structures are identified within a graph structure constructed for multiple source code instructions in a program. Unifiable variables that are not simultaneously used in the source code instructions are identified within each subgraph structure. Finally, one or more unifiable instructions from a tine of a corresponding subgraph structure are transferred to a handle of the corresponding subgraph structure, each unifiable instruction containing one or more unifiable variables.

Figure 1:
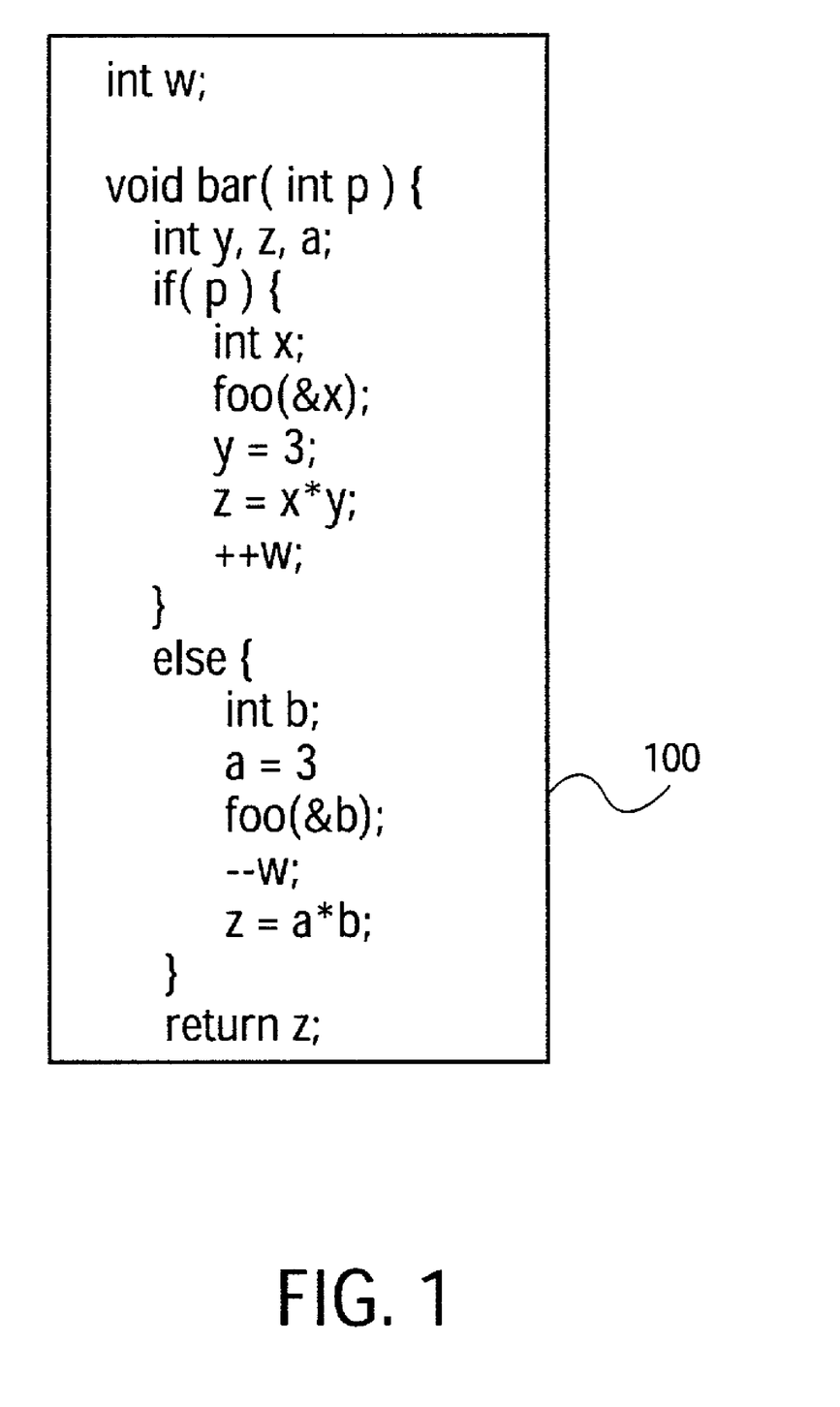
FIG. 1 is an exemplary source code within a program.

FIG. 1 is an exemplary source code within a program. As illustrated in FIG. 1, in one embodiment, the exemplary source code 100 includes multiple lines, each line containing a separate source code instruction. The source code instructions can be at a low backend level, or at some higher level closer to the front end. As shown in FIG. 1, the source code 100 includes an "if(p)" clause and an "else" clause, each containing multiple source code instructions.

Figure 2A:
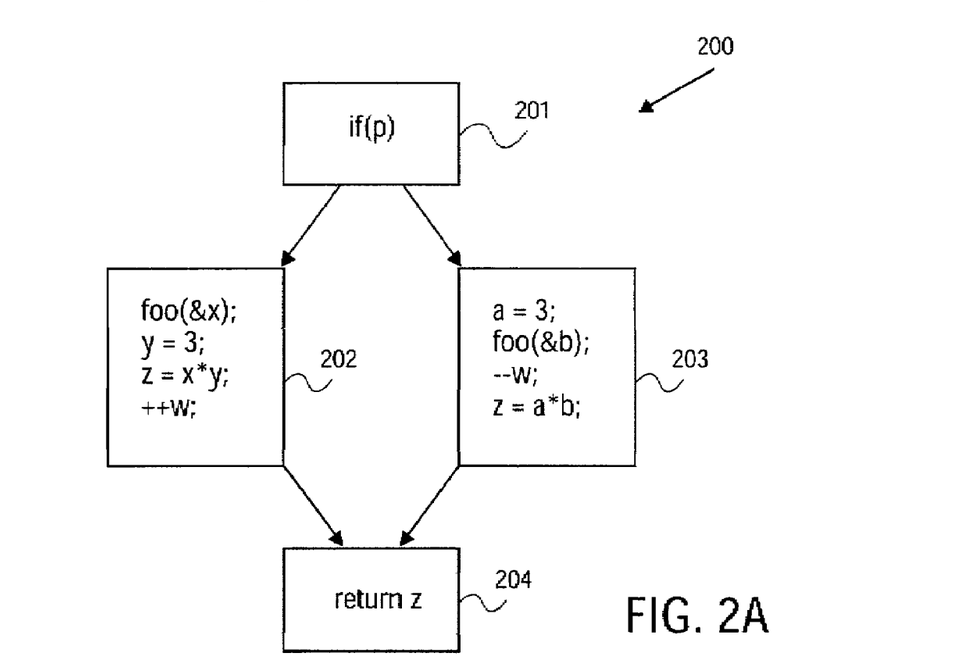
FIG. 2A is a block diagram of one embodiment of a graph structure representing the source code shown in FIG. 1.

FIG. 2A is a block diagram of one embodiment of a graph structure representing the source code shown in FIG. 1. As illustrated in FIG. 2A, in one embodiment, graph structure 200 includes a common predecessor "if(p)" block 201, a subgraph structure containing two tines 202, 203, for example sequences of Instructions with straight-line control flow, also known as basic blocks, and a common successor "return z" block 204. The basic block 202 contains instructions located in the "if(p)" clause of the source code 100 and the basic block 203 contains instructions located in the "else" clause. The two basic blocks 202, 203 share two handles, the common predecessor block 201 and the common successor block 204.

In one embodiment, if a known "omega motion" procedure is used, wherein source code instructions are moved downwardly past join points, matching instructions within the basic blocks 202, 203 are unified and subsequently transferred to common successor block 204, while being removed from their respective locations in the basic blocks 202 and 203. Alternatively, if a known "alpha motion" procedure is used, wherein source code instructions are moved upwardly past fork points, matching instructions within the basic blocks 202, 203 are unified and subsequently transferred to common predecessor block 201, while being removed from their respective locations within the blocks 202 and 203.

For example, in the case of an "omega motion" procedure, the instruction "z=x*y", located within basic block 202, and the instruction "z=a*b", located within basic block 203, may be unified by unifying the variables x and b, and unifying the variables y and a, and by exploiting the fact that each multiplication is commutative. Once the two unifiable instructions are unified, the pair of matching instructions may be removed from the basic blocks 202, 203 and a single copy of the unified instruction may be inserted past the join point. The process of identification and unification of the matching unifiable instructions will be described in further detail below.

Figure 2B:
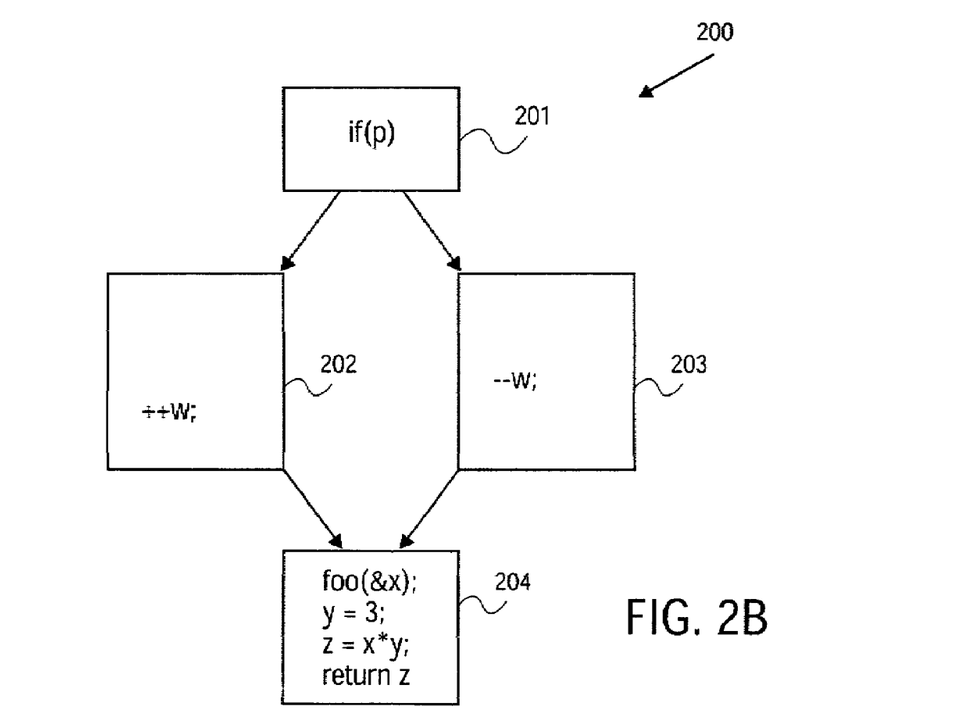
FIG. 2B is a block diagram of one embodiment of the graph structure showing a reduced source code obtained through a method to reduce the size of the source code in a processing system.

FIG. 2B is a block diagram of one embodiment of the graph structure showing a reduced source code obtained through a method to reduce the size of the source code in a processing system. As illustrated in FIG. 2B, the instruction "z=x*y", located within basic block 202, and the instruction "z=a*b", located within basic block 203, are unified by unifying the variables x and b, and unifying the variables y and a. A unified instruction "z=x*y" is transferred to the common successor block 204. The process of transferring the unified instruction to a common handle, for example common successor block 204, will be described in further detail below.

Figure 3:
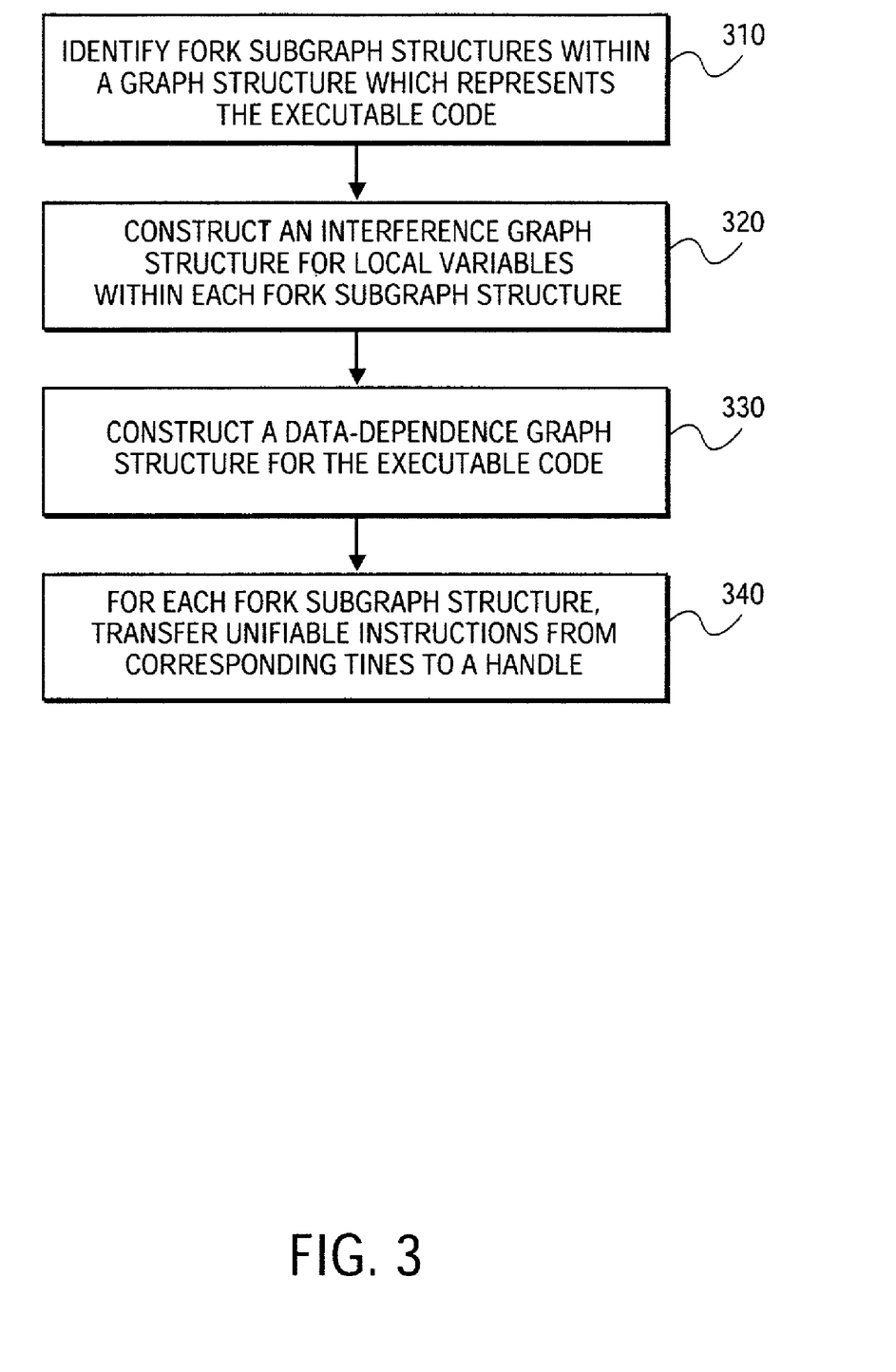
FIG. 3 is a flow diagram of one embodiment of the method to reduce the size of the source code.

FIG. 3 is a flow diagram of one embodiment of the method to reduce the size of the source code. As illustrated in FIG. 3, at processing block 310, fork subgraph structures are identified within a graph structure, which represents the source code. In one embodiment, the source code 100 is scanned for candidate fork subgraph structures. Each fork subgraph structure contains multiple tines or basic blocks, which share a common successor handle or block (in the case of the omega motion procedure) or which share a common predecessor handle or block (in the case of the alpha motion procedure).

At processing block 320, an interference graph structure is constructed for local variables mentioned on the tines of each subgraph structures. In one embodiment, the interference graph structure indicates which variables of the local variables are simultaneously used in the source code instructions within the tines and cannot be unified, i.e., the variables that have overlapping live ranges.

The interference graph structure is represented as a symmetric matrix INTERFERE (i,j), where i and j correspond to local variables. INTERFERE(i,j,) is true if variables i and j are both live at some point in the program. In one embodiment, determining whether the variables have overlapping live ranges can be achieved using one of many known methods of determination. One of such methods is data-flow analysis. In the exemplary source code of FIG. 1, data-flow analysis can determine that a and y are local to different blocks 201 through 204. Another example of such methods is syntactic analysis. Syntactic analysis can determine that b and x are local to their respective blocks, because they are locally scoped.

Figure 4A:
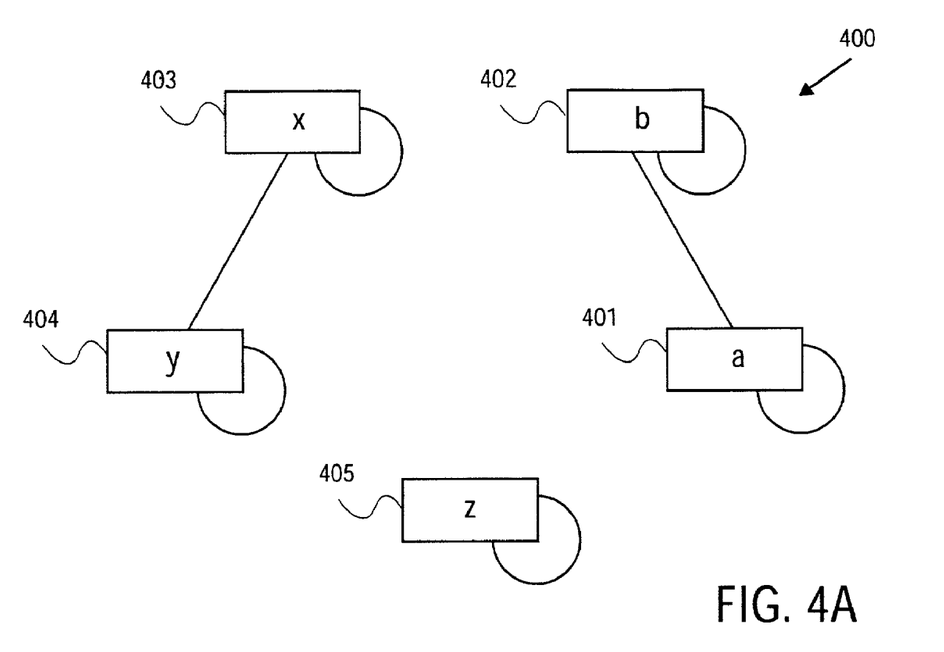
FIG. 4A is a block diagram of one embodiment of an interference graph structure constructed in connection with the source code.

FIG. 4A is a block diagram of one embodiment of an interference graph structure constructed in connection with the source code. As illustrated in Figure 4A, in one embodiment of the interference graph structure 400, node 401 represents local variable a, node 402 represents local variable b, node 403 represents local variable x, node 404 represents local variable y, and node 405 represents local variable z. Variables a and b interfere, respective nodes 401 and 402 being connected to each other. Similarly, variables x and y interfere, respective nodes 403 and 404 being connected to each other.

Variable z does not interfere with any other local variable. For example, variable z is assigned immediately after x and y are last used, so the live range of variable z abuts, but does not overlap, the live ranges of variables x and y. Global variables, for example variable w, are not included in the interference graph structure 400 because they are presumed to have unknown live ranges. In one embodiment, the interference graph structure 400 also includes self loops for each local variable x, y, z, a, and b.

Figure 4B:
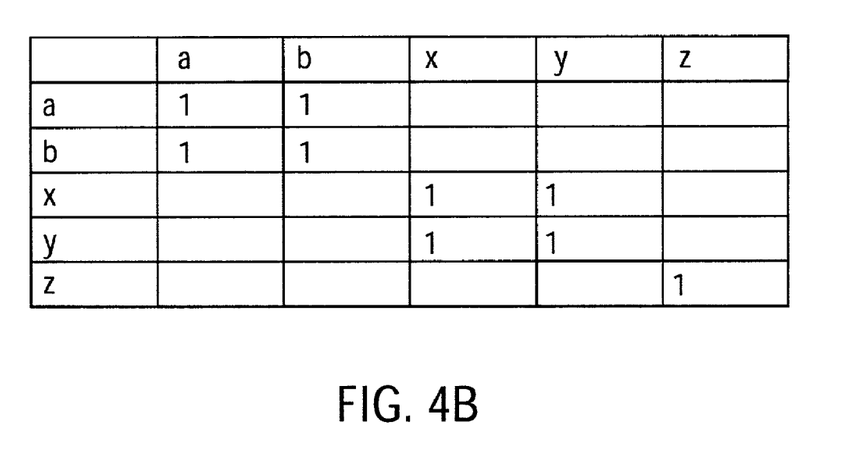
FIG. 4B is a table illustrating the interference graph structure shown in FIG. 4A.

FIG. 4B is a table illustrating the interference graph structure shown in FIG. 4A. As illustrated in FIG. 4B, a "1" value is assigned to any table entry, which has its row and column corresponding to local variables having overlapping live ranges, for example a and b, x and y. A "1" value is assigned to each entry on the main diagonal of the table to account for the self loops.

Referring back to FIG. 3, at processing block 330, a data dependence graph structure is constructed for the source code. In one embodiment, for an alpha motion procedure, the data dependence graph structure has a directed arc u→v,if the instruction u must precede the instruction v, typically because the instruction v uses a value computed by the instruction u, i.e. instruction v depends upon instruction u. Alternatively, for an omega motion procedure, the data dependence graph structure has a directed arc u→v, if the instruction u must succeed the instruction v. An arc u→v is said to be "properly oriented" within a tine t if instructions u and v belong to tine t, and if, when performing alpha motion, instruction u precedes v, or when performing omega motion, instruction u succeeds instruction v. (An improperly oriented arc can arise from loop-carried dependencies.)

Figure 5:
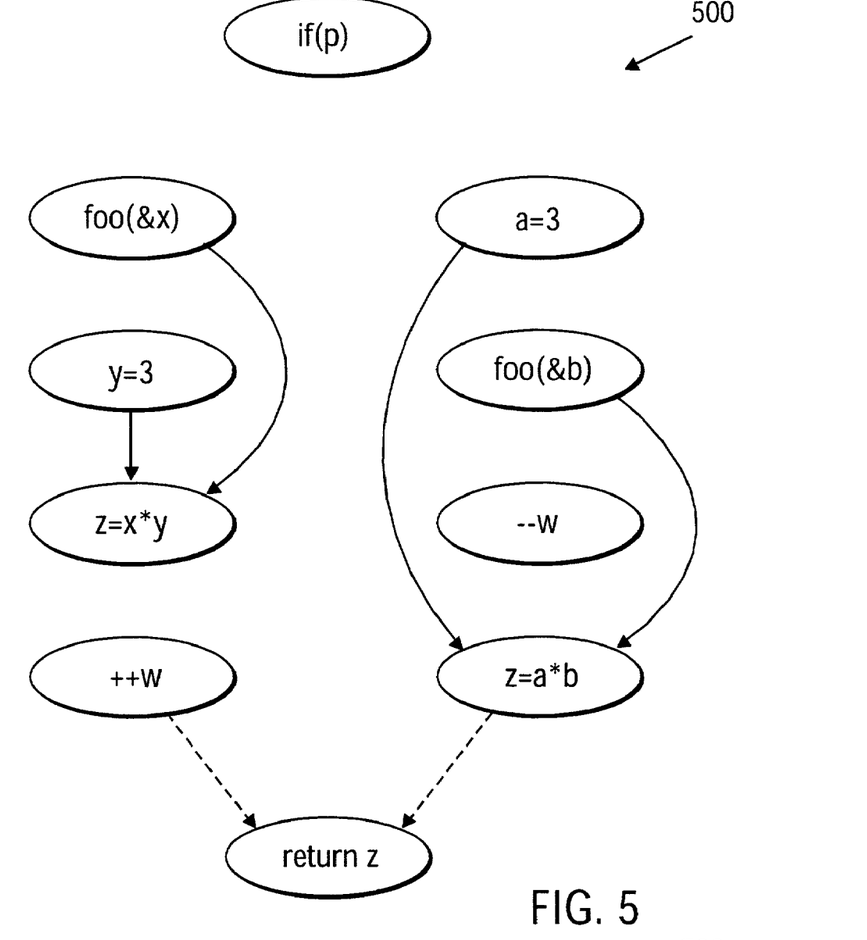
FIG. 5 is a block diagram of a data dependence graph structure constructed in connection with the source code.

FIG. 5 is a block diagram of a data dependence graph structure constructed in connection with the source code. As illustrated in FIG. 5, the data dependence graph structure 500 shows the directed edges between any two instructions within the exemplary source code 100. For example, considering an alpha motion procedure, the foo(&x) instruction must precede the z=x*y instruction, the y=3 instruction must precede the z=x*y instruction, the a=3 instruction must precede the z=a*b instruction, and the foo(&b) instruction must precede the z=a*b instruction.

Referring back to FIG. 3, at processing block 340, for each subgraph structure, unifiable instructions are transferred from corresponding tines to a handle, as described in further detail below.

Figure 6:
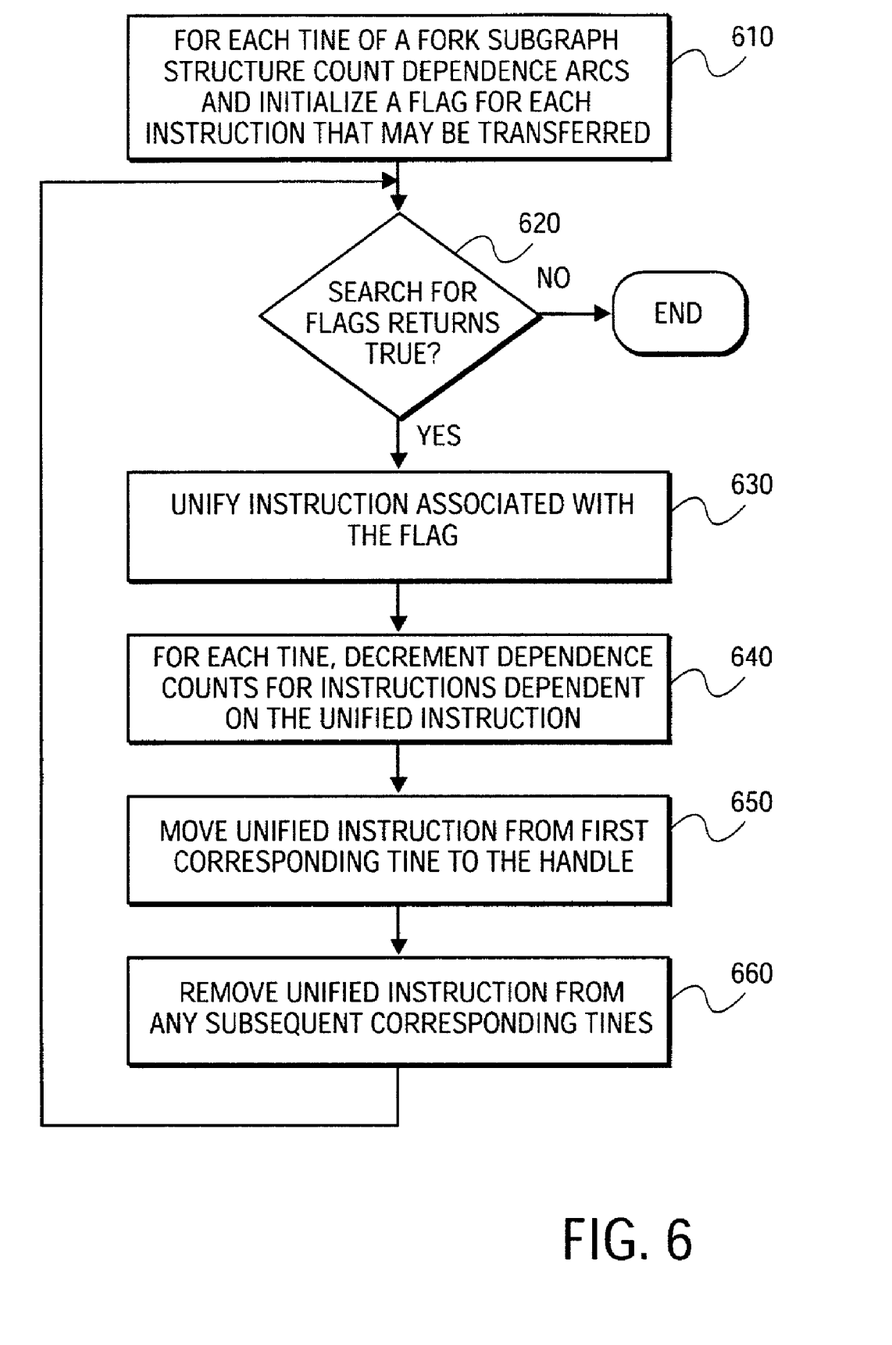
FIG. 6 is a flow diagram of one embodiment of a method to transfer unifiable instructions from the tines to the handle of the graph structure representing the source code.

FIG. 6 is a flow diagram of one embodiment of a method to transfer unifiable instructions from the tines to the handle of the graph structure representing the source code. As illustrated in FIG. 6, at processing block 610, for each tine of a subgraph structure, for each instruction in the tine, dependence arcs are counted and a flag is initialized for each instruction that may be transferred. One embodiment of processing block 610 is implemented in pseudo-code as follows. If all elements of COUNTER are assumed to be previously initialized to zero:

```
For each tine t of fork
    For each instruction x on tine t
        For each dependence arc with tail x do
            If arc is properly oriented within tine t then
                Let y be the head of the arc
                    COUNTER[y] := COUNTER[y]+1;
    For each instruction x on tine t
        If COUNTER[x]==0 then
            READY[t] = READY[t] ∪ {x}
```

At processing block 620, a decision is made whether a search for the flags returns true, i.e. initialized flags are found. One embodiment of processing block 620 is implemented in pseudo-code as follows:

```
procedure FIND_READY() {
    Let s be the first tine.
    r := depth of transaction stack
    For each instruction x in READY[s] do {
        CANDIDATE[s] = x
        For each tine t in a tine distinct from tine s do {
            For each instruction y in READY[t] do {
                if ARE_INSTRUCTIONS_UNIFIABLE (x,y) then {
                    CANDIDATE[t] = y
                    goto next_t
                }
            }
            goto next_x
        next_t:
        }
        //We have a set of unifiable instructions.
        return true;
    next_x:
```

```
        roll back transaction stack to depth r
    }
boolean ARE_INSTRUCTION_UNIFIABLE(x,y) {
    if x and y have the same operator then {
        r := depth of transaction stack
            for each corresponding operand k of x and y do {
                if not ARE_OPERANDS_UNIFIABLE(x[k], y[k]) {
                    roll back transaction stack to depth r
                    return false
                }
            }
        return true
    } else {
        return false;
    }
}
boolean ARE_OPERANDS_UNIFIABLE(a,b) {
    If a and b are not the same kind of operand, return false;
    If a and b do not have equivalent types, return false;
    switch kind of a:
        LITERAL:
            if b has same value as a return true
            else return false;
        INDIRECTION:
            if base pointers for a and b are unifiable return true
            else return false;
        VARIABLE:
            Let A be union-find representative for a.
            Let B be union-find representative for b.
            It A==B then return true;
            If A and B are local variables and not
CHECK_FOR_INTERFERENCE(a,b) then {
                Tentatively unify A and B
                Push transaction for the tentative unification onto the
transactions stack.
                return true;
            } else {
                return false;
            }
    end switch
    return false;
}
boolean CHECK_FOR_INTERFERENCE(a,b) {
    for each element i in union-find set of a do
        for each element j in union-find set of b do
            if INTERFERE(i,j)
                return false
    return true;
}
```

A "transaction stack" is a stack of information about tentative unifications that might have to be rolled back, i.e. undone. In the pseudo-code, the phrase "roll back transaction stack to depth r" means to iteratively pop transactions, and undo their effects, until the stack has depth r again.

In order to match variables, a look up for their union-find representatives is performed to assess if the representatives are equal. If so, the variables are already identical, or have already been unified (possibly tentatively). Otherwise, a check is performed to assess if the variables' union-find representatives do not interfere (i.e. have disjoint live ranges). If two variables do not interfere, then the variables are tentatively unified. A transaction for this unification is then pushed onto the transaction stack, so that it can be undone at a later time if considered necessary.

If no flags are found and the search returns false, then the procedure ends. Otherwise, if the search for flags returns true, at processing block 630, the instructions associated with the initialized flags are unified. One embodiment of processing block 630 is implemented in pseudo-code as follows:

```
procedure DO_REQUIRED_UNIFICATIONS {
    for each transaction stack entry u from bottom to top
        do unification specified by u
    set transaction stack to empty
}
```

At processing block 640, for each tine, dependence counts for the instructions dependent on the unified instructions are decremented. One embodiment of processing block 640 is implemented in pseudo-code as follows:

```
For each tine t of fork
    For each dependence arc with tail CANDIDATE[t] do
        If arc is properly oriented within tine t then {
            Let y be the head of the arc
            COUNTER[y] = COUNTER[y]-1;
            if COUNTER[y]==0 then
                READY[t] = READY[t] ∪ {y}
        }
```

At processing block 650, the unified instruction is moved from the first corresponding tine to the handle. Finally, at processing block 660, any unified instruction is removed from any subsequent corresponding tines. Processing blocks 620 through 660 are subsequently repeated.

Figure 7:
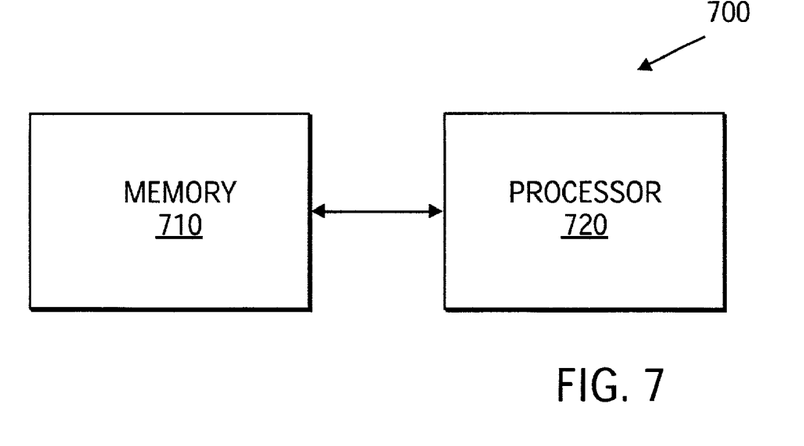
FIG. 7 is a block diagram of one embodiment of the processing system.

FIG. 7 is a block diagram of one embodiment of the processing system. As illustrated in FIG. 7, processing system 700 includes a memory 710 and a processor 720 coupled to the memory 710. In some embodiments, the processor 720 is a processor capable of compiling software and annotating code regions of the program. Processor 720 can be any type of processor capable of executing software, such as a microprocessor, digital signal processor, microcontroller, or the like. The processing system 700 can be a personal computer (PC), mainframe, handheld device, portable computer, set-top box, or any other system that includes software.

Memory 710 can be a hard disk, a floppy disk, random access memory (RAM), read only memory (ROM), flash memory, or any other type of machine medium readable by the processor 720. Memory 710 can store instructions to perform the execution of the various method embodiments of the present invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   identifying a plurality of fork subgraph structures within a graph structure constructed for a plurality of source code instructions;
   identifying, prior to register allocation, a plurality of unifiable variables within each fork subgraph structure of said plurality of fork subgraph structures, which are not simultaneously used in said plurality of source code instructions;
   constructing a dependence graph of said plurality of source code instructions;

using said dependence graph to identify at least two unifiable instructions of said plurality of source code instructions, within said plurality of fork subgraph structures, said at least two unifiable instructions containing at least one unifiable variable of said plurality of unifiable variables;

unifying each unifiable variable within said at least two unifiable instructions to generate a corresponding unified instruction for each of the at least two unifiable instructions; and transferring said at least two unifiable instructions of said plurality of source code instructions from respective tines of corresponding fork subgraph structures of said plurality of fork subgraph structures to store a matching unified instruction within a handle corresponding to said fork subgraph structures, if the corresponding unified instructions of said at least two unifiable instructions match.

2. The method according to claim 1, wherein identifying said plurality of unifiable variables further comprises:

constructing an interference graph structure for a plurality of local variables within said each fork subgraph structure, said plurality of local variables including said plurality of unifiable variables; and identifying said plurality of unifiable variables as variables having non-overlapping live ranges within said interference graph structure.

3. The method according to claim 2, wherein said interference graph structure indicates which variables of said plurality of local variables are simultaneously used in said plurality of source code instructions and cannot be unified.

4. The method according to claim 1, wherein identifying said plurality of unifiable variables further comprises:

constructing a data dependence graph structure for said plurality of source code instructions; and identifying said plurality of unifiable variables using said data dependence graph structure.

5. The method according to claim 1, wherein said transferring further comprises:

initializing a flag for said at least one unifiable instruction.

6. The method according to claim 5, wherein said transferring further comprises:

removing said at least one unifiable instruction from subsequent tines of said corresponding fork subgraph structure.

7. The method according to claim 4, wherein said data dependence graph structure contains a plurality of dependence arcs, each dependence arc connecting two instructions of said plurality of source code instructions contained within said tine of said corresponding fork subgraph structure.

8. A system comprising:

means for identifying a plurality of fork subgraph structures within a graph structure constructed for a plurality of source code instructions;

means for identifying, prior to register allocation, a plurality of unifiable variables within each fork subgraph structure of said plurality of fork subgraph structures, which are not simultaneously used in said plurality of source code instructions;

means for constructing a dependence graph of said plurality of source code instructions;

means for using said dependence graph to identify at least one unifiable instruction of said plurality of source code instructions, within said plurality of fork subgraph structures, said at least two unifiable instructions containing at least one unifiable variable of said plurality of unifiable variables;

means for unifying each unifiable variable within said at least two unifiable instructions to generate a corresponding unified instruction for each of the at least two unifiable instructions; and means for transferring said at least two unifiable instructions of said plurality of source code instructions from corresponding tines of corresponding fork subgraph structures of said plurality of fork subgraph structures to store a matching unified instruction within a handle corresponding to said fork subgraph structures, if the corresponding unified instructions of said at least two unifiable instructions match.

9. The system according to claim 8, further comprising:

means for constructing an interference graph structure for a plurality of local variables within said each fork subgraph structure, said plurality of local variables including said plurality of unifiable variables; and means for identifying, prior to register allocation, said plurality of unifiable variables as variables having overlapping live ranges within said interference graph structure.

10. The system according to claim 9, wherein said interference graph structure indicates which variables of said plurality of local variables are simultaneously used in said plurality of source code instructions and cannot be unified.

11. The system according to claim 8, further comprising:

means for constructing a data dependence graph structure for said plurality of source code instructions; and means for identifying said plurality of unifiable variables using said data dependence graph structure.

12. The system according to claim 8, further comprising: means for initializing a flag for said at least one unifiable instruction.

13. The system according to claim 12, further comprising:

means for removing said at least one unifiable instruction from subsequent tines of said corresponding fork subgraph structure.

14. The system according to claim 11, wherein said data dependence graph structure contains a plurality of dependence arcs, each dependence arc connecting two instructions of said plurality of source code instructions contained within said tine of said corresponding fork subgraph structure.

15. A computer readable medium containing instructions, which, when executed in a processing system, cause said processing system to perform a method comprising:

identifying, prior to register allocation, a plurality of fork subgraph structures within a graph structure constructed for a plurality of source code instructions;

identifying a plurality of unifiable variables within each fork subgraph structure of said plurality of fork subgraph structures, which are not simultaneously used in said plurality of source code instructions;

constructing a dependence graph of said plurality of source code instructions;

using said dependence graph to identify at least two unifiable instructions of said plurality of source code instructions, within said plurality of fork subgraph structures, said at least one unifiable instruction containing at least one unifiable variable of said plurality of unifiable variables;

unifying each unifiable variable within said at least two unifiable instructions to generate a corresponding unified instruction for each of the at least two unifiable instructions; and transferring said at least two unifiable instructions of said plurality of source code instructions from respective tines of a corresponding fork subgraph structures of said plurality of fork subgraph structures to store the unified instruction within a handle corresponding to said fork subgraph structures, if the corresponding unified instructions of said at least two unifiable instructions match.

16. The computer readable medium according to claim 15, wherein identifying said plurality of unifiable variables further comprises:
constructing an interference graph structure for a plurality of local variables within said each fork subgraph structure, said plurality of local variables including said plurality of unifiable variables; and
identifying said plurality of unifiable variables as variables having overlapping live ranges within said interference graph structure.

17. The computer readable medium according to claim 16, wherein said interference graph structure indicates which variables of said plurality of local variables are simultaneously used in said plurality of source code instructions and cannot be unified.

18. The computer readable medium according to claim 15, wherein identifying said plurality of unifiable variables further comprises:
constructing a data dependence graph structure for said plurality of source code instructions; and
identifying said plurality of unifiable variables using said data dependence graph structure.

19. The computer readable medium according to claim 15, wherein said transferring further comprises:
initializing a flag for said at least one unifiable instruction.

20. The computer readable medium according to claim 19, wherein said transferring further comprises:
removing said at least one unifiable instruction from subsequent tines of said corresponding fork subgraph structure.

21. The computer readable medium according to claim 18, wherein said data dependence graph structure contains a plurality of dependence arcs, each dependence arc connecting two instructions of said plurality of source code instructions contained within said tine of said corresponding fork subgraph structure.

22. A system comprising:
a memory having stored thereon a plurality of source code instructions to be executed in a program; and
a processor coupled to said memory
to identify a plurality of fork subgraph structures within a graph structure constructed for said plurality of source code instructions;
to identify, prior to register allocation, a plurality of unifiable variables within each fork subgraph structure of said plurality of fork subgraph structures, which are not simultaneously used in said plurality of source code instructions;
to construct a dependence graph of said plurality of source code instructions;
to use said dependence graph to identify at least one unifiable instruction of said plurality of source code instructions, within said plurality of fork subgraph structures said at least one unifiable instruction containing at least one unifiable variable of said plurality of unifiable variables;
to unify each unifiable variable within said at least two unifiable instructions to generate a unified instruction for each of the at least two unifiable instructions; and
to transfer said at least two unifiable instructions of said plurality of source code instructions from respective tines of a corresponding fork subgraph structures of said plurality of fork subgraph structures to store a matching unified instruction within a handle corresponding to said fork subgraph structures, if the corresponding unified instructions of said at least two unifiable instructions match.

23. The system according to claim 22, wherein said processor further constructs an interference graph structure for a plurality of local variables within said each fork subgraph structure, said plurality of local variables including said plurality of unifiable variables and further identifies said plurality of unifiable variables as variables having overlapping live ranges within said interference graph structure.

24. The system according to claim 23, wherein said interference graph structure indicates which variables of said plurality of local variables are simultaneously used in said plurality of source code instructions and cannot be unified.

25. The system according to claim 22, wherein said processor further constructs a data dependence graph structure for said plurality of source code instructions and identifies said plurality of unifiable variables using said data dependence graph structure.

26. The system according to claim 22, wherein said processor further initializes a flag for said at least one unifiable instruction and unifies each unifiable variable within said at least one unifiable instruction.

27. The system according to claim 26, wherein said processor further removes said at least one unifiable instruction from subsequent tines of said corresponding fork subgraph structure.

28. The method according to claim 25, wherein said data dependence graph structure contains a plurality of dependence arcs, each dependence arc connecting two instructions of said plurality of source code instructions contained within said tine of said corresponding fork subgraph structure.

* * * * *